United States Patent [19]
Bates et al.

[11] Patent Number: 6,108,668
[45] Date of Patent: Aug. 22, 2000

[54] METHOD AND SYSTEM FOR UNDOING EDITS WITHIN SELECTED PORTION OF ELECTRONIC DOCUMENTS

[75] Inventors: Cary Lee Bates, Rochester; Jeffrey Michael Ryan, Byron, both of Minn.

[73] Assignee: International Business Machines Corporation, Armonk, N.Y.

[21] Appl. No.: 08/844,121

[22] Filed: Apr. 18, 1997

[51] Int. Cl.[7] .............................. G06F 12/00; G06F 15/00
[52] U.S. Cl. ......................... 707/203; 707/530; 707/531; 707/539
[58] Field of Search ................................... 707/203, 530, 707/531, 539

[56] References Cited

U.S. PATENT DOCUMENTS

| | | | |
|---|---|---|---|
| 5,251,316 | 10/1993 | Anick et al. | 707/101 |
| 5,530,794 | 6/1996 | Lubbert | 707/524 |
| 5,754,737 | 5/1998 | Gipson | 706/11 |
| 5,802,380 | 9/1998 | Bangs et al. | 707/515 |

OTHER PUBLICATIONS

Tanaka et al, Introduction of CDH and its Feasibility Study on Multimedia Document Conferencing System, IEEE, pp. 4–3–1 —4–3–6, May 1994.

Primary Examiner—Thomas G. Black
Assistant Examiner—Frantz Coby
Attorney, Agent, or Firm—Felsman, Bradley, Gunter & Dillon, LLP

[57] ABSTRACT

Provided is a method and system, to be utilized with an editing system having electronic document editing capabilities, which provides an ability to selectively undo previous edits performed upon a selected particular portion of an electronic document. The method and system provide the forgoing objects in the following manner. Previous edits performed within an electronic document are stored. A contiguous block of data within an electronic document wherein the stored previous edits are to be undone is selected. In response to user input, part or all of any of the stored previous edits that have been done within the selected contiguous block of data are then undone.

23 Claims, 9 Drawing Sheets

METHOD AND SYSTEM FOR UNDOING EDITS WITHIN SELECTED PORTION OF ELECTRONIC DOCUMENTS

BACKGROUND OF THE INVENTION

1. Technical Field

The present invention relates, in general, to an improved editing system. In particular, the present invention relates to an improved editing system having a scheme for recollecting and undoing operations performed by said editing system.

2. Description of the Related Art

The present invention relates to editing systems. An editing system is generally an application program for creating and changing electronic documents. Well known types of editing systems are line editors and full-screen editors. However, probably the best know type of editing system is the word processing system.

A word processing system is an application program that provides for the creation and changing of electronic documents. Historically, word processing systems were used to work exclusively on textual documents (hence the name "word processing systems"), but today's word processing systems are capable of working on every type of document in existence, including, but not limited to, text, graphics, pictures, video data, audio data, etc.

A word processing system creates and changes an electronic document via the successive applications of "edits" to the electronic document. The term "edit" means to intentionally change data in an electronic document for a specific purpose and in accordance with prescribed rules. Examples of editing are to correct errors in text, delete text, change the format (e.g., italicize, or underline) of text, manipulating photographs, etc. M. Weik, *Communications Standard Dictionary* 279 (3rd ed. 1996).

Each "edit" of a computer file generally requires the execution of one or more "editing commands." An "editing command" is an imperative instruction that an operator or program may give to a computer to require the computer to perform a specified operation on specified data in a selected file, such as insert a character, delete a character, start a new paragraph, insert a line, change a pixel or pixels, etc. M. Weik, *Communications Standard Dictionary* 279 (3rd ed. 1996).

Most word processing systems keep a sequential (generally with the most recent "edit" listed first) list of past "edits" to an electronic document. Such past "edits" can generally be accessed to "undo" edits done previously. In order to "undo" a particular operation, a user generally locates a specific "edit" in a "previous edits" list, and directs that the word processing system "undo" that particular edit. In response, the word processing system restores the data affected by the particular "edit" selected to its "pre-edit" form.

While the foregoing "undo" scheme has proven to be of great use, there are presently needs which are not being met by existing "undo" schemes. Those needs arise out of the fact that the existing sequential "undo" lists prove unsatisfactory when a user wants to "undo" edits made to a particular section of text or data within a file, where such edits to be "undone" may have been made much earlier than the last edits, or where such edits to be undone might have been done to a particular section of text or data within a file, but were such edits were very far apart in sequence.

These needs can be made more tangible by the following (non-exclusive) example.

Assume that a technical professional (such as an engineer) is editing an electronic document with a word processing system. Assume that the 10th through the 20th (in sequence) edits to his document were done to the second paragraph of his document. Assume further that the engineer goes on to do subsequent edits to many other parts of the document, and subsequently returns to the second paragraph of the document to perform the 66th through 69th edits (in sequence).

Now assume that a client enters the engineer's office and revises the requirements of the project toward which the engineer's document is directed. The engineer realizes that the original version of his paragraph two is what he needs in light of the new requirements from his client. That is, the engineer desires that he be able to reconstruct his paragraph two prior to edit 10 through edit 20, and edit 66 through edit 69. That is, the engineer needs to "undo" edits 10–20 and edits 60–69.

Unfortunately, the engineer will have an arduous task with existing word processing systems. The best he can hope for is to be able to search back through the "previous edits" list, find the 66th–69th edits and the 10th–20th edits and "undo" them manually. The engineer would find his life much easier if he could selectively "undo" only the edits made to paragraph two of his document, but under the current state of the art this is not possible.

Thus, it is apparent from the foregoing that a need exists for the present invention: a method and system which will allow the selective "undoing" of edits done to particular sections of text or data within an electronic document.

SUMMARY

It is therefore one object of the present invention to provide an improved editing system.

It is therefore another object of the present invention to provide an improved editing system having a scheme for recollecting and undoing operations performed by said editing system.

It is therefore another object of the present invention to provide an improved editing system having a scheme for recollecting and undoing operations performed by said editing system, and which provides the ability to selectively "undo" previous edits to an electronic document, in such a fashion that only the edits done to a particular section of an electronic document will be undone, leaving the other edits to the electronic document undisturbed.

The forgoing objects are achieved as is now described. A method and system, to be utilized with an editing system having electronic document editing capabilities, are provided which yield an ability to selectively undo previous edits performed upon a selected particular portion of an electronic document. Previous edits performed within an electronic document are stored. A contiguous block of data within an electronic document wherein the stored previous edits are to be undone is selected. In response to user input, part or all of any of the stored previous edits that have been done within the selected contiguous block of data are then undone.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF AN ILLUSTRATIVE EMBODIMENT

The following detailed description will discuss an illustrative embodiment of the present invention as implemented with a word processing system. However, it will be understood by those skilled in the art that an illustrative embodiment of the present invention could be utilized with any editing system which edits any conceivable type of electronic document, and hence is not limited to word processing systems. Furthermore, with respect to the following figures, like parts are indicated by like numbers.

The following description utilizes the term "electronic document", and as used herein is to have the meaning as broad as the following definitions of "electronic" and "document," combined. As used herein, the term "document" means "a data medium that has data recorded on it, usually has permanence, and can be read by a person or machine." Weik, *Communications Standard Dictionary* 261 (3rd ed. 1996). As used herein, the term "electronic" means "pertaining to the effects, motion, and behavior of electrons and other charged particles under the influence of electric and magnetic fields, chemical reaction, physical force (sound, vibration, shock, gravity), bombardment by atomic particles and photons, and other forms of excitation." Weik, *Communications Standard Dictionary* 290 (3rd ed. 1996).

Figure 1:
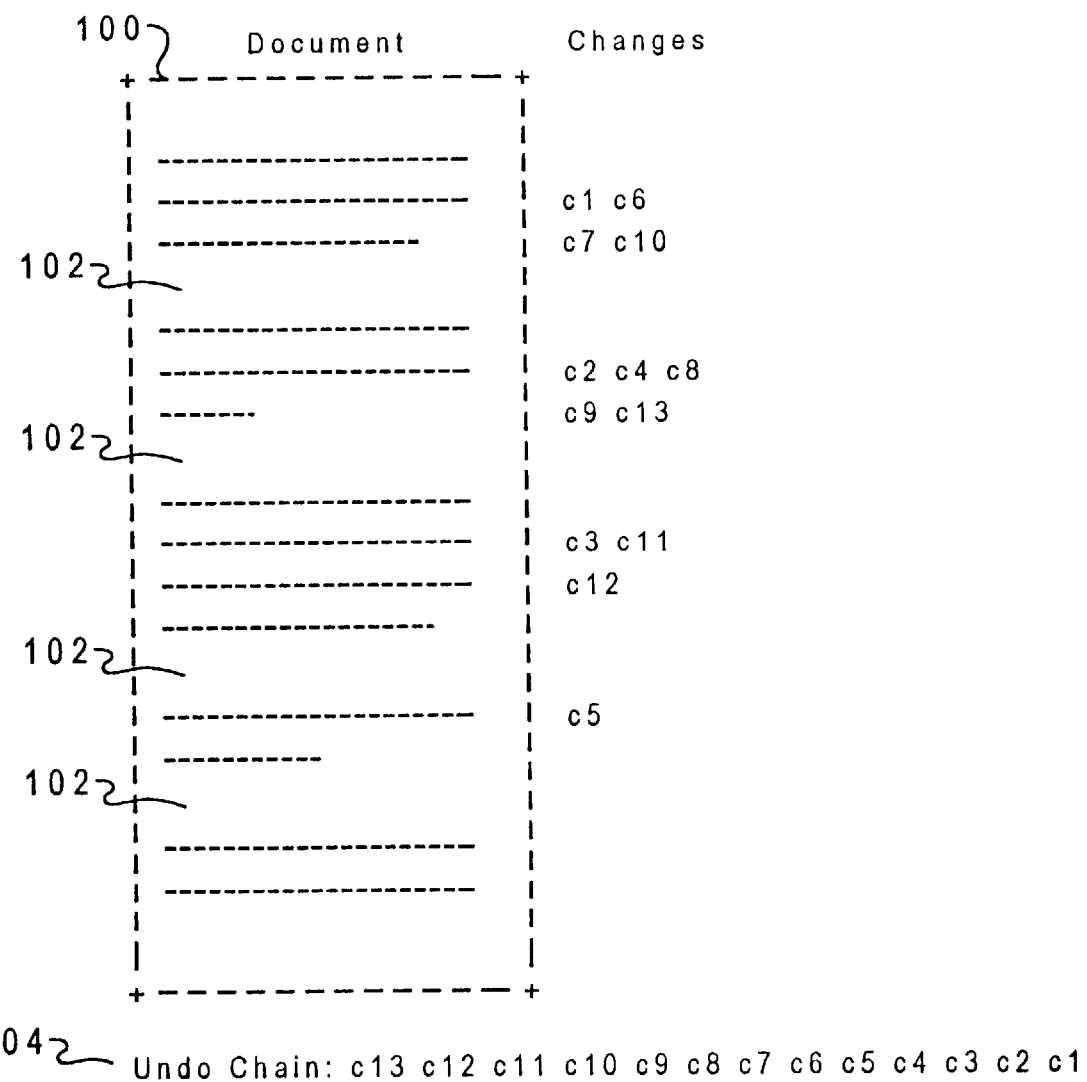
FIG. 1 depicts a partially schematic diagram which illustrates the logic upon which a "previous edits" list is based.

With reference now to the figures and in particular with reference now to FIG. 1, there is depicted a partially schematic diagram which illustrates the logic upon which a "previous edits" list is based. Depicted in FIG. 1 is a pictographic representation of an electronic document 100 which contains lines of text, the differing sections of which are denoted by blank lines 102 in the figure. The electronic document 100 depicted has been undergoing a series of "edits," or changes (such as inserting text, deleting text, changing fonts, etc.), which are denoted in FIG. 1 as c1, c2, c3, . . . , c13. As has been discussed, many word processing systems keep a sequential list of "previous edits." Since the list of "previous edits" is most often used to "undo" the previous editing operations, it is often referred to as an "undo chain." Thus, in FIG. 1, the list of "previous edits" appears as an "undo chain" 104 which is composed of previous edits (each of which is associated with a specific location within the file), with the last edit performed being the first in the list. As can be seen from FIG. 1, these sequential edits have appeared at various places throughout the file, and thus utilizing this list in the sequence given will first result in "undoing" an edit near the second section of the electronic document (i.e. "undoing" c13), next result in "undoing" an edit near the third section of the electronic document (i.e., "undoing" c12), next result in "undoing" an edit near to the third section of the electronic document (i.e., "undoing" c11), etc.

Figure 2A:
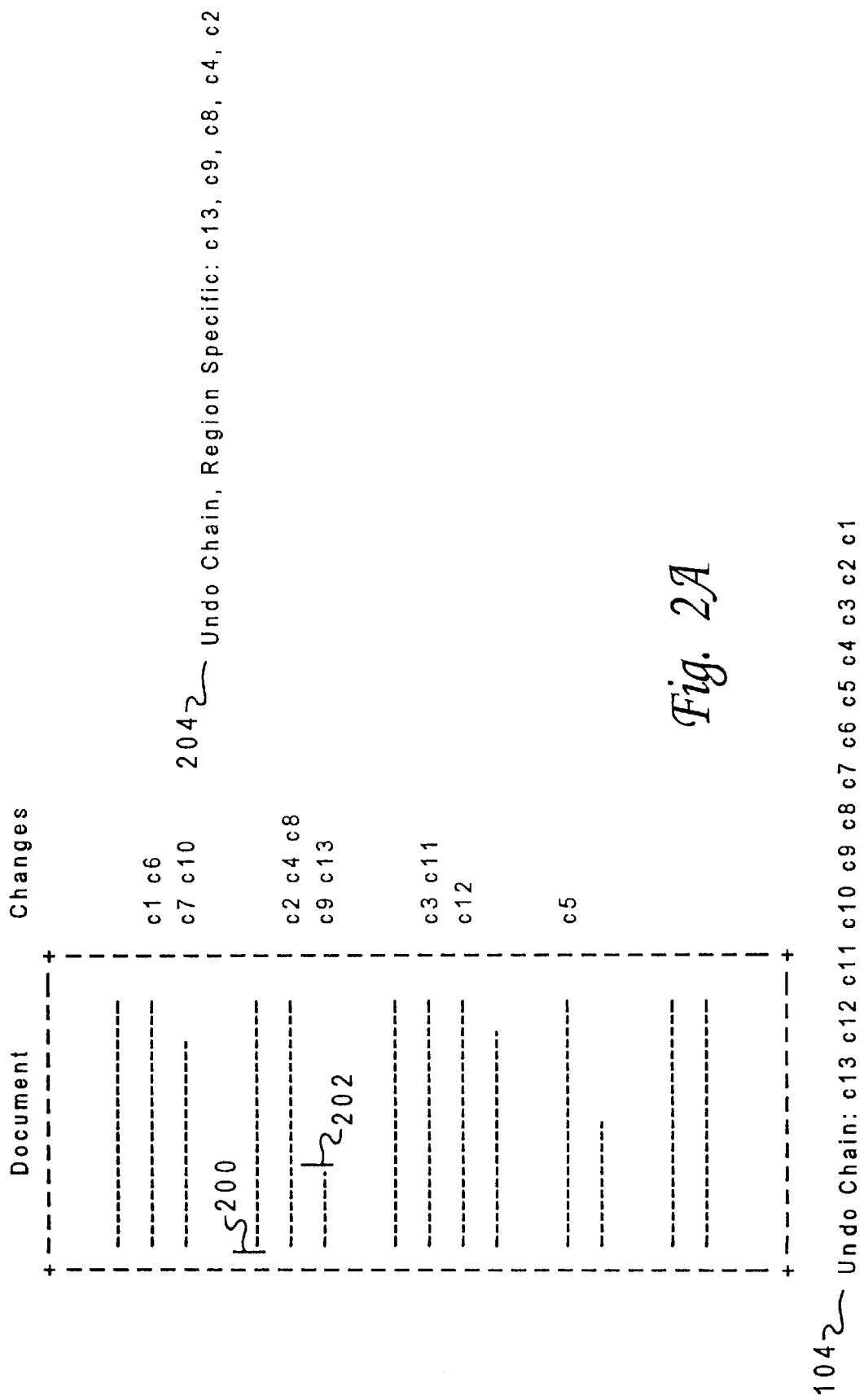
FIGS. 2A, 2B, and 2C are illustrations of partially schematic diagrams which illustrate the concepts involved in how an illustrative embodiment of the present invention utilizes a "previous edits" list to allow the "selective undoing" of edits made to a specific portion of an electronic document.
Figure 2B:
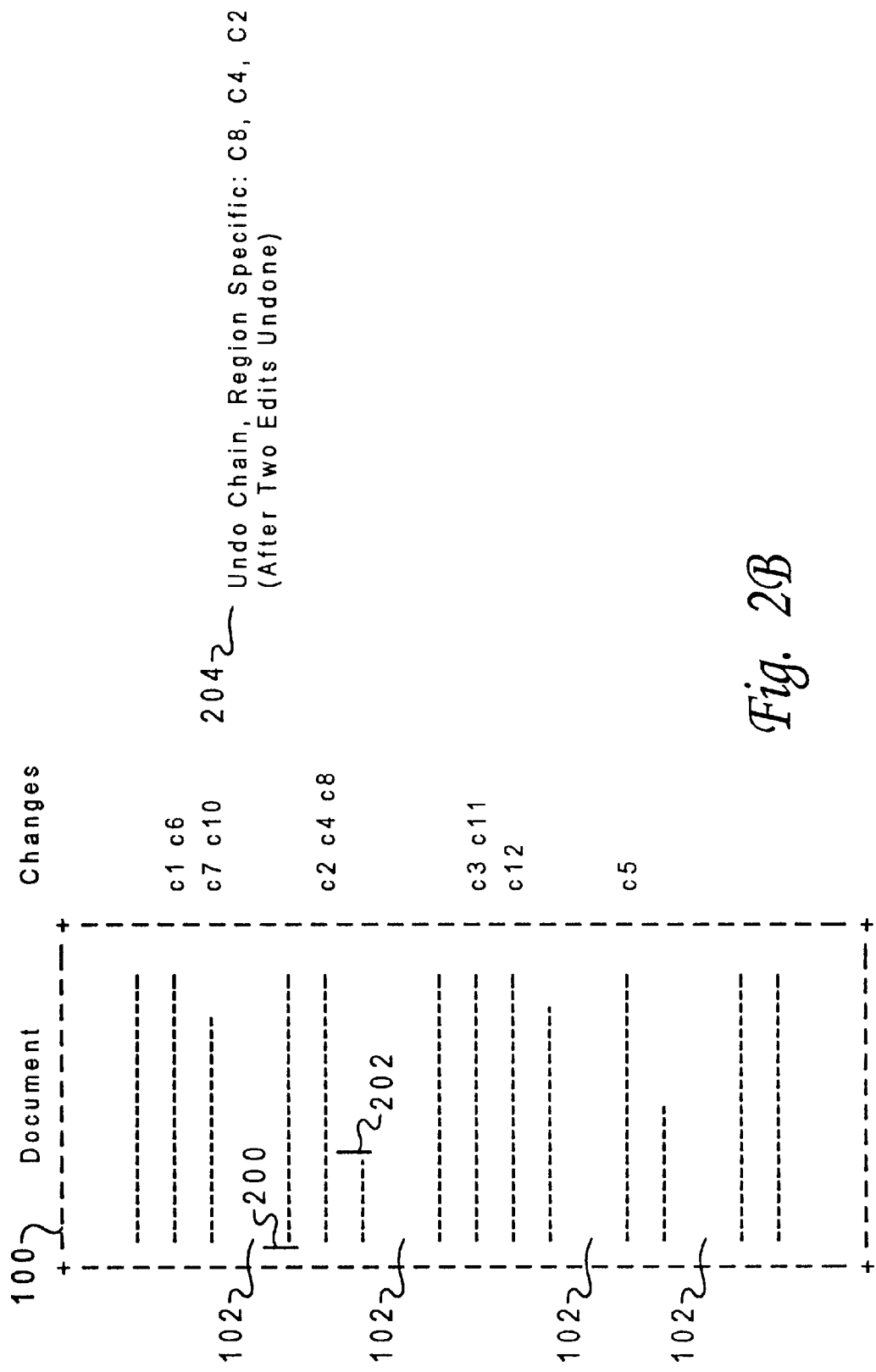
Figure 2C:
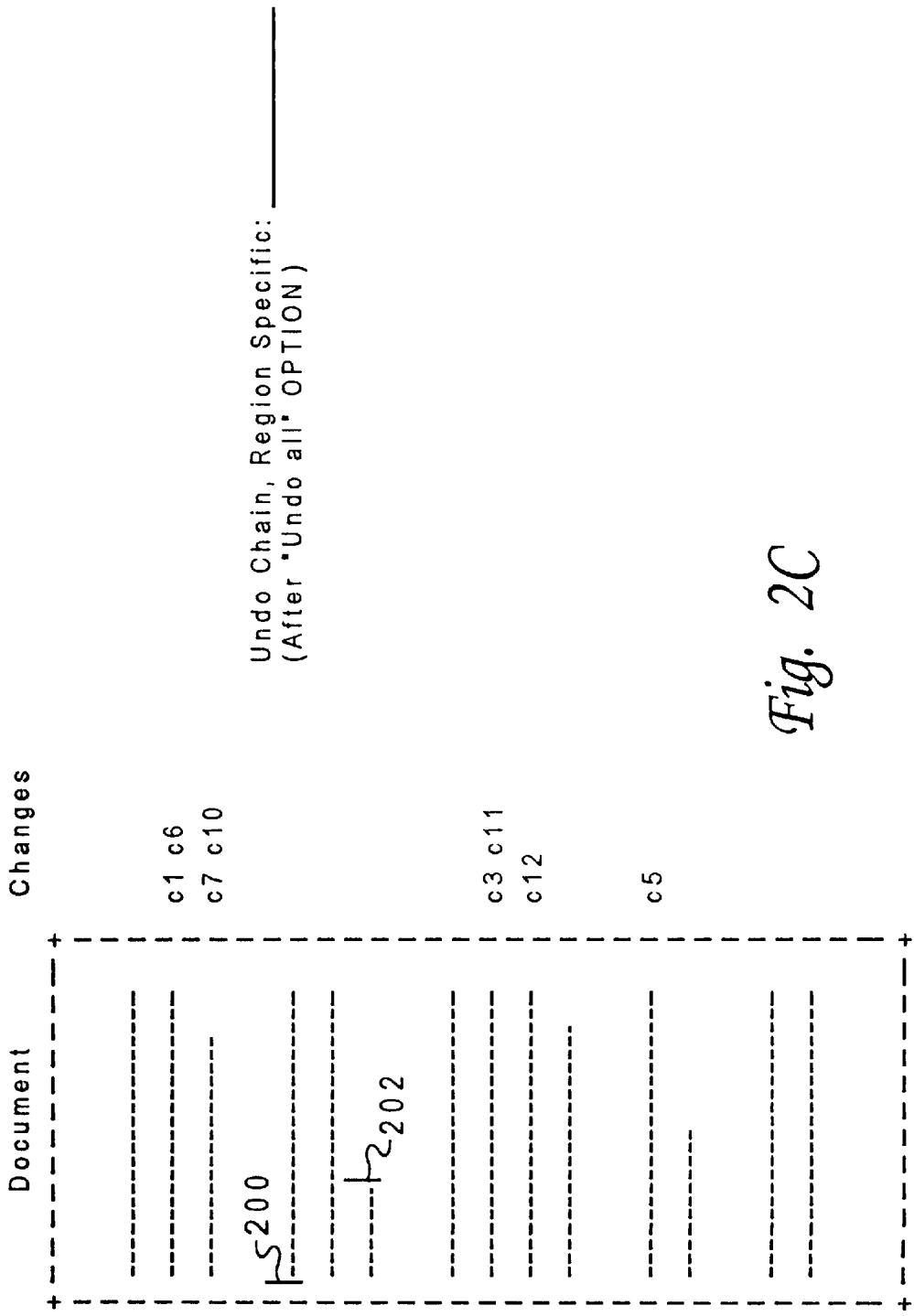

Referring now to FIGS. 2A, 2B, and 2C which are partially schematic diagrams which illustrate the concepts involved in how an illustrative embodiment of the present invention utilizes a "previous edits" list to allow the selective undoing of edits made to a specific portion of an electronic document. Depicted in FIG. 2 is a pictographic representation of electronic document 100 which contains lines of text, the differing sections of which are denoted by blank lines 102 in the figure. The electronic document 100 depicted has been undergoing a series of "edits," or changes (such as inserting text, deleting text, changing fonts, etc.), which are denoted in FIG. 2 as c1, c2, c3, . . . , c13. As has been discussed, many word processing systems keep a sequential list of "previous edits." Now assume that a user wants to "undo" all edits that were made to the second paragraph. With the traditional "undo chain" 104 shown in FIG. 2 this would be very difficult. However, an illustrative embodiment of the present invention allows the user to selectively denote (shown in the figure as being between selective denotation markers 200 and 202) where in the document the user wishes to undo previous edits. In response to such selective denotation, in a sense an illustrative embodiment of the present invention creates a second and temporary "undo chain," shown in FIG. 2 as "undo chain, region specific" 204. As can be seen from the figure, "undo chain, region specific" 204 is composed only of those edits performed to the specific region of text which the user has selectively denoted: c13, c9, c8, c4, c2. This "undo chain, region specific" list can then be used to undo only those edits done to the region of text which has been selectively denoted by the user.

In an illustrative embodiment of the present invention, at least two options are available with respect to the selective undoing operation: sequential and "undo all" undoing. In sequential undoing the "undo chain, region specific" list can be used to sequentially undo operations to the selected text in reverse order. In the "undo all" option, which is user selectable, the "undo chain, region specific" list is used to "undo all" of the changes done to the selected text, thus returning the selected text to the condition it was in prior to any of the edits contained in the "undo chain."

FIG. 2B illustrates the state of electronic document 100, "undo chain, region specific" 204, and undo chain 104 after two edits within "undo chain, region specific" 204 have been sequentially undone. Note that changes c13 and c9 (which appeared in FIG. 2A) no longer appear in "undo chain, region specific" 204, nor undo chain 104. That is because the edits have been undone and hence no longer appear on these lists of edits. Notice also that electronic document 100 no longer shows the effects of changes C13 and C9 in that they have been undone an the electronic document has been restored to its pre- c13 and c9 edits state.

FIG. 2C shows the state of electronic document 100, "undo chain, region specific" 204, and undo chain 104 after an "undo all" operation has been performed utilizing "undo chain, region specific" 204. Note that no changes (such as appeared in FIG. 2A) now appear in "undo chain, region specific" 204, nor undo chain 104, because all changes in the selected region have been undone. Notice also that electronic document 100 paragraph 2 no longer shows the effects of any edits. All edits have been undone and the electronic document has been restored to its pre-edits state.

Figure 3:
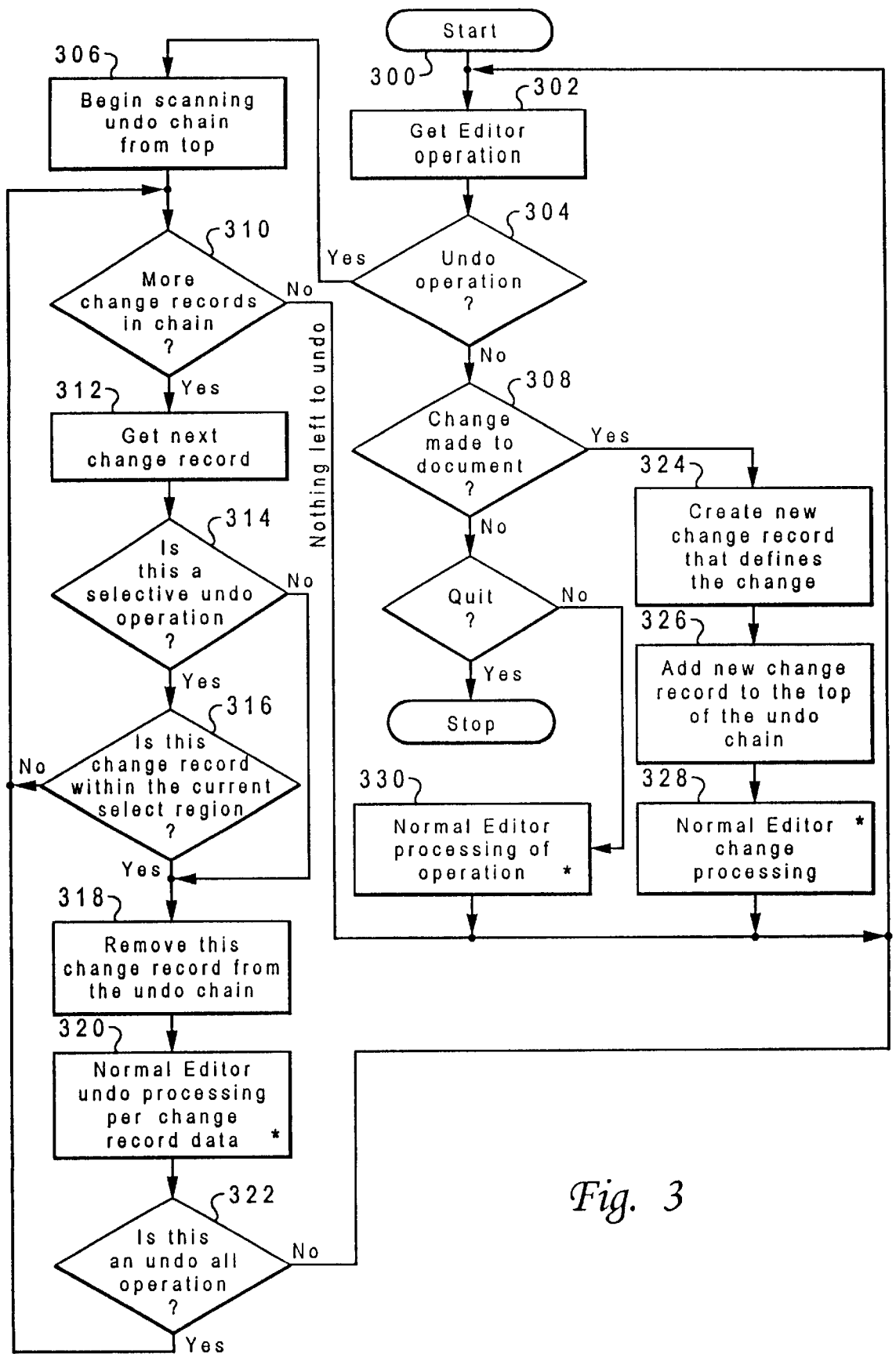
FIG. 3 is a high-level logic flowchart depicting the method and process of an illustrative embodiment of the present invention.

Refer now to FIG. 3, which is a high-level logic flowchart depicting the method and process of an illustrative embodiment of the present invention. The method and process is intended to be utilized as part of and with editing systems. While FIG. 2 depicted the concepts involved in an illustrative embodiment of the present invention, FIG. 3 illustrates how an illustrative embodiment of the present invention actually utilizes the "undo chain" to selectively undo "previous edits." Shown is the start of the process at method step 300. Method step 302 depicts the denotation of an occurrence of an user-generated editor operation. Method step 304 illustrates the determination of whether the user-generated editor operation denoted in method step 302 was an "undo" operation. If the determination shows that the editor operation received in method step 302 was an "undo" operation, then the process proceeds to method step 306 and continues from that point. If the determination of method step 304 yields the determination that the editor operation received in method step 302 was not an "undo" operation, then the process proceeds to method step 308 and continues from that point.

Method step 306 shows the scanning of an "undo" chain, beginning with the first "change record" (which depicts the location and manner of an edit done to an electronic document being edited) in the chain (the chain can be visualized as being stretched vertically with the top of such vertically stretched chain being referred to as the beginning of the chain and the bottom as the end of the chain which is denoted by an end-of-chain marker, and hence in the flowchart scanning the first change record is referred to as examining the change record at the "top" of the chain). Method step 310 depicts the determination of whether the end of the "undo chain" has been reached, which would mean that there are no more chain records in the "undo chain." If method step 310 finds that the end of the "undo chain" has been reached, then the process proceeds to method step 302 and re-executes from that point. However if the determination of method step 310 shows that there are more editor operations in the "undo chain" (i.e., that the end of the "undo chain" has not been reached) then the process proceeds to method step 312. Method step 312 shows the retrieval of the most recent change record which appears at the top of the "undo chain" and which was just scanned in method step 306 (i.e., method step 306 did not remove the change record from the "undo chain" but in fact just insured that the end-of-chain marker had not been reached).

Method step 314 depicts the determination of whether the current "undo" operation (i.e., the one that was detected in method step 304) is a "selective undo" operation, meaning that the previous editor operations to be undone are to be localized to a particular selected region of text. In the event that the determination of method step 314 indicates that the "undo" operation is a "selective undo" operation, then the process proceeds to method step 316; otherwise, the process proceeds to method step 318.

Method step 316 illustrates the determination of whether the change record read in method step 312 relates to a change in the current selected region of an electronic document wherein the "selective undoing" of edits is to take place. If the change record relates to a change in region where the "selective undoing" is to take place, then the process proceeds to method step 318, but if the change is not in the region where the "selective undoing" is to take place the process proceeds to method step 310 and continues from there. This loop, method step 316 returning to method step 310, ensures that if there is an edit within the "undo chain" which is in the current selected region then that edit will be detected.

Should it be determined in method step 316 that the change record read in method step 312 relates to a change in the current selected region within the electronic document wherein the "selective undoing" of edits is to take place, the process proceeds to method step 318 wherein the change record read in method step 312 is removed from the "undo chain" (because this edit will subsequently be "undone" thereby vitiating the need to have the previous edit (change) in the "undo list"). Subsequently, method step 320 depicts performing the normal editor "undo" processing that is to be done in response to the change record read in method step 312.

Method step 322 shows the determination of whether the "undo" operation (which, at this point in the process, could have been either a "selective undo" or a "non-selective undo"), as was detected in method step 302, is an "undo all" type of operation or a "sequential undo" type of operation. If the "undo" being performed is an "undo all" type of operation, then the process returns to method step 310 and proceeds from that point (thereby ensuring that every change record in the "undo" list relative to the type of "undo" operation (i.e., "selective" or "non-selective") is undone). If the "undo" being performed is not an "undo all" type of operation then the process proceeds to method step 302 and proceeds from that point.

It was explained above that if the determination of method step 304 yields the determination that the editor operation received in method step 302 was an undo operation, then the process proceeds to method step 306. On the other hand, if the determination of method step 304 (discussed above) yields the determination that the editor operation received in method step 302 was not an undo operation, then the process proceeds to method step 308 and continues from that point.

Method step 308 shows the determination of whether the editor operation received in method step 302 equates to a change to be made to the document. If the editor operation did equate to a change to the document the process proceeds to method step 324. Method step 324 depicts the creation of a record of the change made to the document, and associates the change made with a position within the document. Thereafter, method step 326 depicts the addition of this change record to the top of the "undo" chain (i.e., is put first in the list of change records, with the list being sequentially arranged with the most recent change first (on top) and the least recent change last (on bottom). Subsequently, method step 328 illustrates normal editor change processing of the received editor request of method step 302.

If it is determined in method step 308 that the editor command received in method step 302 does not require a change to the document, as far as an illustrative embodiment of the present invention is concerned such is a non-issue and thus the process returns control to normal editor processing and operation as is shown in method step 330. Subsequently, the process returns to method step 302 and awaits the execution of the next editor operation.

Figure 4:
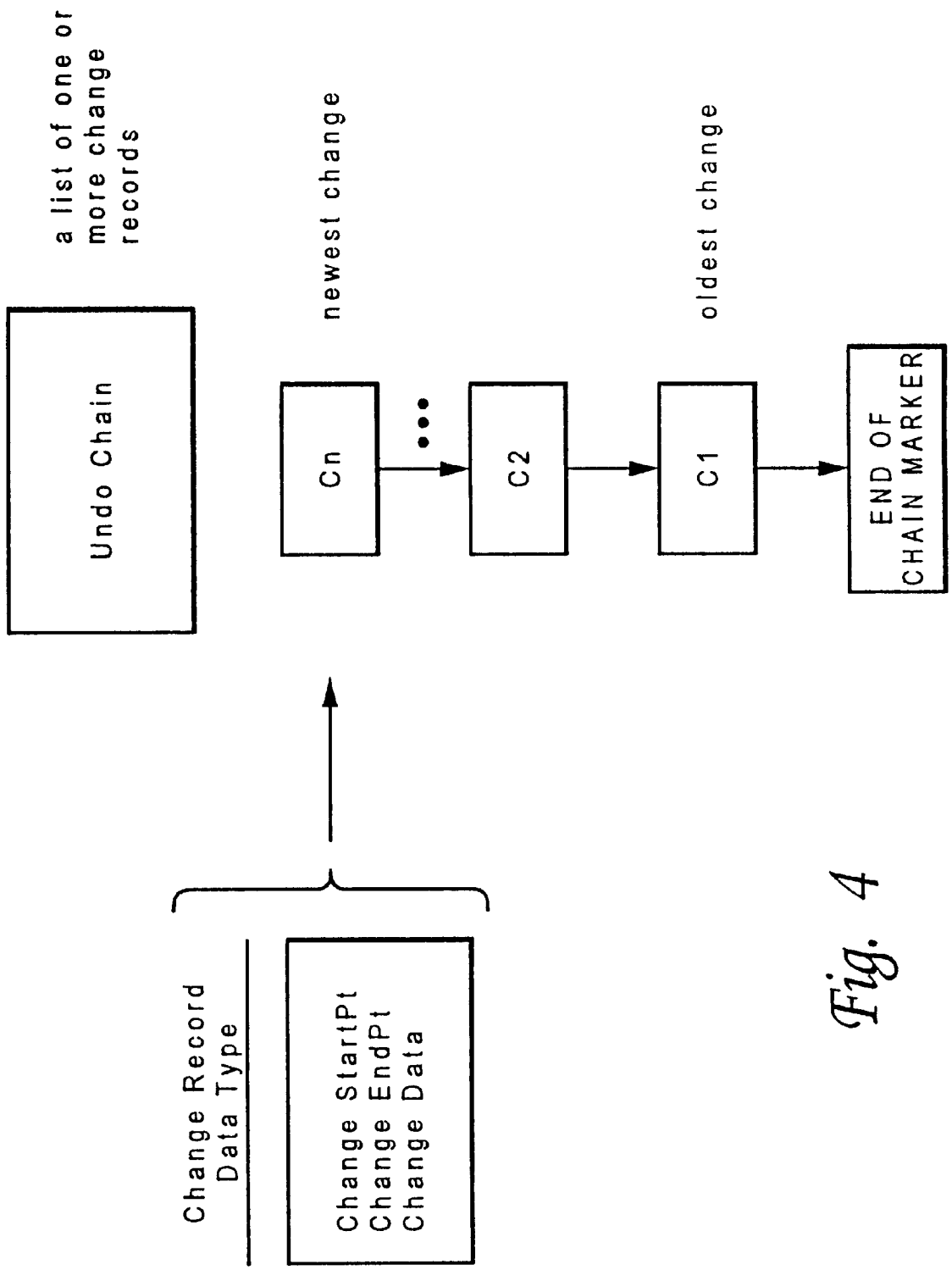
FIG. 4 is a partially schematic diagram of the conceptual organization of an "undo chain" composed of "change records"

Referring now to FIG. 4, which is a partially schematic diagram of the conceptual organization of the "undo chain" composed of "change records" as was described in reference to FIG. 3. Shown in FIG. 4 is that each "change record" incorporates a "change startpoint" field (a positional reference within the document that demarcates the starting point of the edit), a "change endpoint" field (a positional reference within the document that demarcates the ending point of the edit), and a "change data" field (which is a record of the edit function that make up the change being recorded). Also shown is how the most recent change appears at the "top" of the "undo chain," while the least recent change appears at the "bottom" of the "undo chain."

Figure 5:
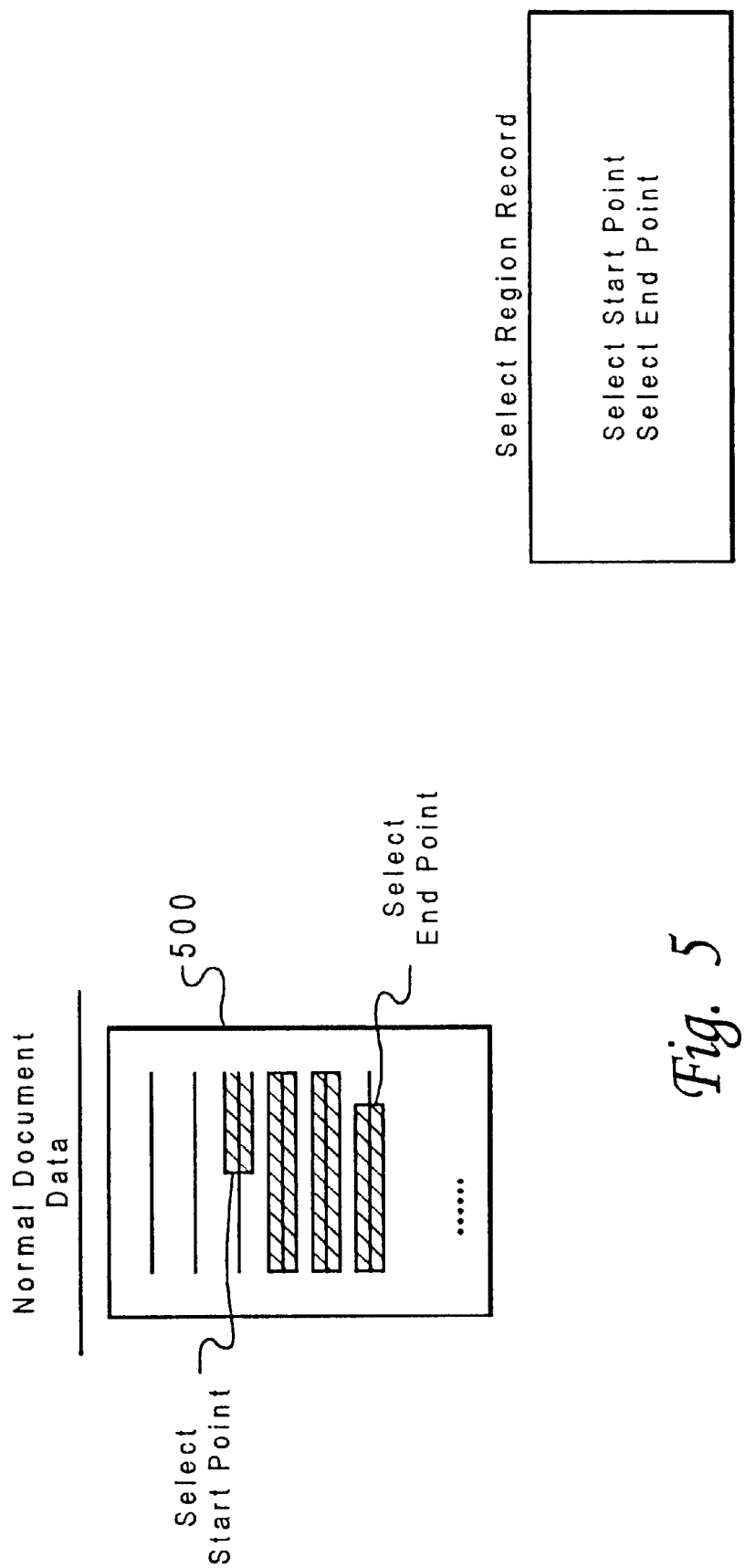
FIG. 5 is a partially schematic diagram of the concepts involved in the "selective undo" operation.

Refer now to FIG. 5, which is a partially schematic diagram of the concepts involved in the "selective undo" operation described in reference to FIG. 3. Depicted is a data file 500 containing line of data. The selection of data is illustrated by the "select region" record which contains a "select startpoint" field (a positional reference within the document that demarcates the starting point within the text where edits are to be selectively undone) and a "select endpoint" field (a positional reference within the document that demarcates the ending point within the text where the edits are to be selectively undone). These "select startpoint" and "select endpoint" records are then compared with "change startpoint" and "change endpoint" fields within each examined change record to determine if a particular change record relates to edits that were done within a selected region of text within a data file, as was described in relation to method step 316 of FIG. 3.

Figure 6:
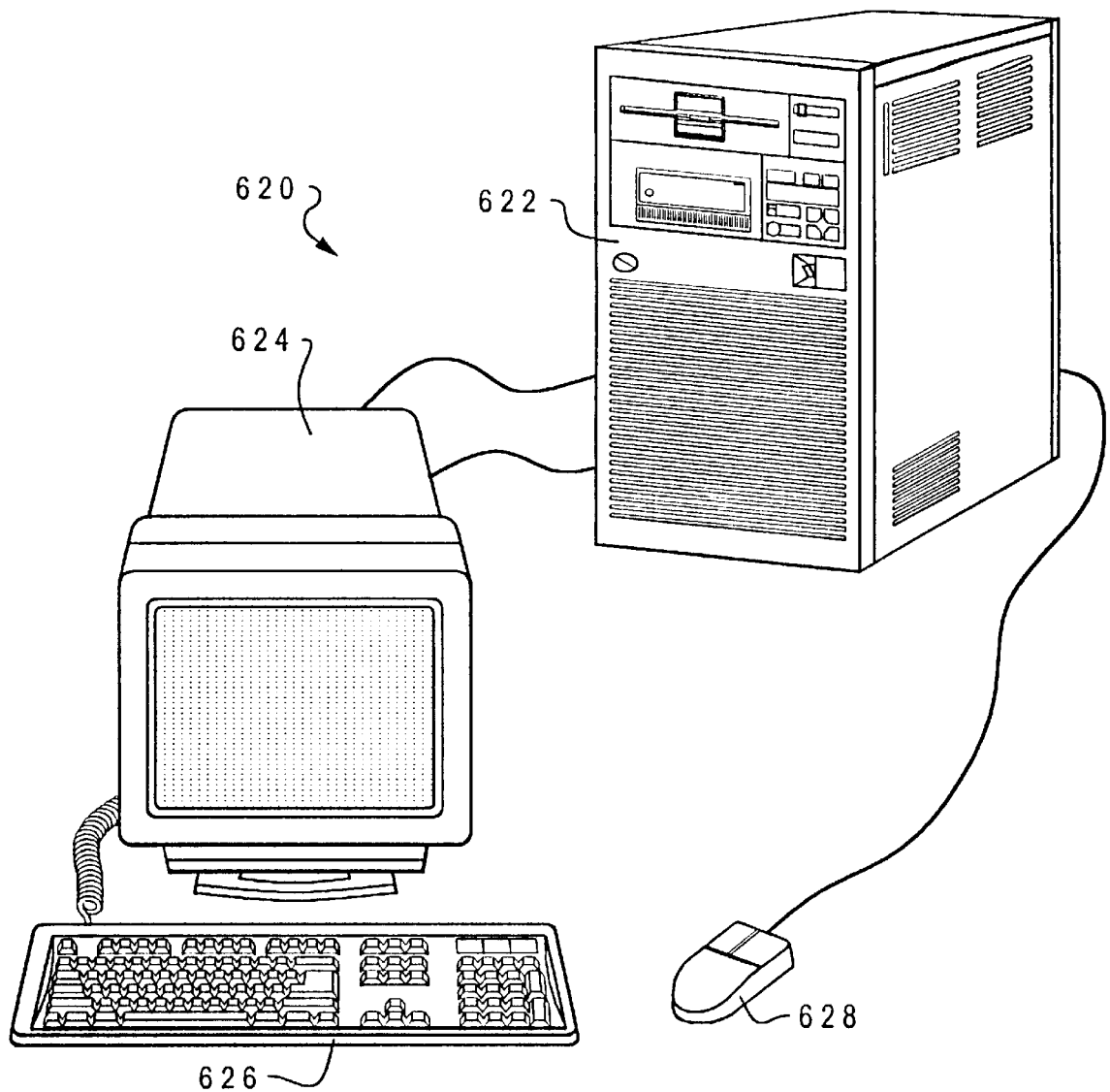
FIG. 6 is a pictorial representation of a data-processing system.

With reference now to the figures and in particular with reference now to FIG. 6, there is depicted a pictorial representation of a data-processing system which can be utilized in accordance with the method and system of an illustrative embodiment of the present invention. The method and system provided by an illustrative embodiment of the present invention can be implemented with the data-processing system depicted in FIG. 6. A computer 620 is depicted which includes a system unit 622, a video display terminal 624, a keyboard 626, and a mouse 628. Computer 620 may be implemented utilizing any suitable computer such as the IBM RISC/6000 computer or IBM "Aptiva" computer, both products of International Business Machines Corporation, located in Armonk, N.Y. "RISC SYSTEM/6000" and "Aptiva" are trademarks of International Business Machines Corporation.

Figure 7:
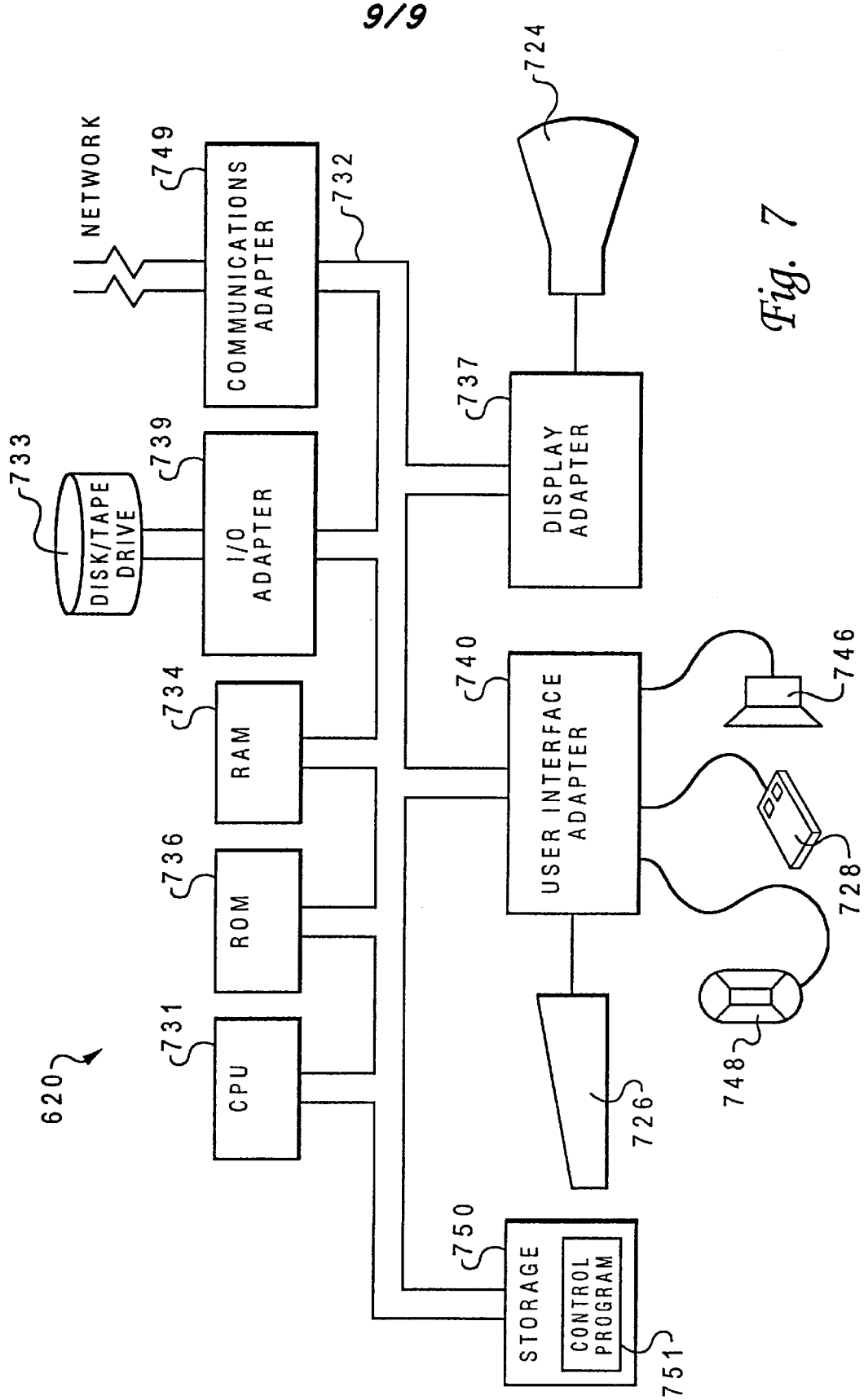
FIG. 7 is an illustration of a representative hardware environment which can be utilized in accordance with the method and system of an illustrative embodiment of the present invention.

FIG. 7 is an illustration of a representative hardware environment which can be utilized in accordance with the method and system of an illustrative embodiment of the present invention. FIG. 7 depicts selected components in computer 620 in which an illustrative embodiment of the present invention may be implemented. System unit 622 includes a Central Processing Unit ("CPU") 731, such as a conventional microprocessor, and a number of other units interconnected via system bus 732. Computer 620 includes random-access memory ("RAM") 734, read-only memory ("ROM") 736, display adapter 737 for connecting system bus 732 to video display terminal 724, and I/O adapter 739 for connecting peripheral devices (e.g., disk and tape drives 733) to system bus 732. Video display terminal 724 is the visual output of computer 620, which can be a CRT-based video display well-known in the art of computer hardware. However, with a portable or notebook-based computer, video display terminal 724 can be replaced with an LCD-based or a gas plasma-based flat-panel display. Computer 620 further includes user interface adapter 740 for connecting keyboard 726, mouse 728, speaker 746, microphone 748, and/or other user interface devices, such as a touch screen device (not shown), to system bus 732. Communications adapter 749 connects computer 620 to a data-processing network.

Any suitable machine-readable media may retain the method and system of an illustrative embodiment of the present invention, such as RAM 734, ROM 736, a magnetic diskette, magnetic tape, or optical disk (the last three being located in disk and tape drives 733). Any suitable operating system and associated graphical user interface (e.g., Microsoft Windows) may direct CPU 731. For example, the AIX operating system and AIX windows windowing system (i.e., graphical user interface) can direct CPU 731. The AIX operating system is IBM's implementation of the UNIX operating system. UNIX is a trademark of UNIX Systems Laboratories, Inc. The RISC System/6000 system, among others, can run on the AIX operating system. Other technologies can also be utilized in conjunction with CPU 731, such as touch-screen technology or human voice control. In addition, computer 620 includes a control program 751 which resides within computer storage 750. Control program 751 contains instructions that when executed on CPU 731 carries out the operations depicted in the logic flowchart of FIG. 3, and the partially schematic diagrams of FIGS. 4 and 5 as described herein.

Those skilled in the art will appreciate that the hardware depicted in FIG. 7 may vary for specific applications. For example, other peripheral devices such as optical disk media, audio adapters, or chip programming devices, such as PAL or EPROM programming devices well-known in the art of computer hardware, and the like may be utilized in addition to or in place of the hardware already depicted.

As a final matter, it is important that while an illustrative embodiment of the present invention has been, and will continue to be, described in the context of a fully functional computing system, those skilled in the art will appreciate that the mechanisms of an illustrative embodiment of the present invention are capable of being distributed as a program product in a variety of forms, and that an illustrative embodiment of the present invention applies equally regardless of the particular type of signal bearing media used to actually carry out the distribution. Examples of signal bearing media include recordable type media such as floppy disks, hard disk drives, CD ROMs, and transmission type media such as digital and analogue communication links.

While the invention has been shown and described with reference to particular embodiments thereof, it will be understood by those skilled in the art that the foregoing and other changes in form and detail may be made therein without departing from the spirit and scope of the invention, which is defined only by the following claims.

What is claimed is:

1. A method to be utilized with an editing system having electronic document editing capabilities, said method providing an ability to selectively undo previous edits performed within a selected particular portion of an electronic document, and said method comprising the steps of:

storing all previous edits performed within an electronic document by creating an undo chain comprising a sequentially ordered list of said created change records said list ending with an end-of-chain record;

selecting a contiguous block of data within said electronic document wherein one or more of said stored previous edits are to be undone; and in response to user input, undoing a selected portion of said one or more said stored previous edits that have been done only within said selected contiguous block such that the ability to selectively undo said stored previous edits performed within a selected particular portion of an electronic document is achieved.

2. The method of claim 1, wherein said selecting step further comprises the step of:

equating failure to select a contiguous block of data within said electronic document wherein one or more of said stored previous edits are to be undone with selecting the entire said electronic document.

3. The method of claim 2, wherein said undoing step further comprises the steps of:

determining if said user input is a either a selective undo operation or a selective undo all operation;

in response to a determination that said user input is a selective undo operation, undoing the most recent said stored previous edits performed within said selected contiguous block of data; and in response to a determination that said user input is a selective undo all operation, undoing all said stored previous edits performed within said selected contiguous block of data.

4. The method of claim 2, wherein said selecting step further comprises the step of creating a select region record comprised of a select startpoint field and a select endpoint field.

5. The method of claim 1, wherein said storing all previous edits step further comprises the step of creating a change record, for each previous edit, comprised of a change startpoint field, a change endpoint field, and a change data field.

6. The method of claim 5, wherein said undoing step further comprises the steps of:

in response to a determination that a not yet examined change record nearest the top of said created undo chain is not an end-of-chain record, retrieving said not yet examined change record;

examining said retrieved change record for the purpose of determining whether said retrieved change record contains changes performed within said selected contiguous block of data;

determining whether said user input is either a selective undo operation or a selective undo all operation;

in response to a determination that said user input is a selective undo operation and said examining step yielding a determination that said retrieved record contains changes that were performed within said selected contiguous block of data, substantially simultaneously undoing the changes indicated by said retrieved created change record's change data field and removing said retrieved created change record from said created undo chain;

in response to a determination that said user input is a selective undo all operation and said examining step yielding a determination that said retrieved change record contains changes that were performed within said selected contiguous block of data, undoing the changes indicated by said retrieved created change record's change data field and returning to said retrieving said not yet examined change record step; and in response to said examining step yielding a determination that said retrieved change record does not contain changes that were performed within said selected contiguous block of data, returning to said retrieving said not yet examined change record step.

7. The method of claim 6, wherein said examining step further comprises the following steps:

determining whether a first region delimited by said retrieved change record's change startpoint and change endpoint fields is encompassed by a second region delimited by said select region record's select startpoint field and select endpoint field; and in response to a determination that said first region is encompassed within said second region, determining that said retrieved change record contains changes that were performed within said selected contiguous block of data, but otherwise determining that said retrieved change record does not contain changes that were performed within said selected contiguous block of data.

8. An apparatus to be utilized with an editing system having electronic document editing capabilities, said apparatus providing an ability to selectively undo previous edits performed within a selected particular portion of an electronic document, and said apparatus comprising:

means for storing all previous edits performed within an electronic document further comprising means for creating an undo chain comprised of a sequentially ordered list of said created change records said list ending with an end-of-chain record;

means for selecting a contiguous block of data within said electronic document wherein one or more of said stored previous edits are to be undone; and means, responsive to user input, for undoing a selected portion of said one or more said stored previous edits that have been done only within said selected contiguous block such that the ability to selectively undo said stored previous edits performed within a selected particular portion of an electronic document is achieved.

9. The apparatus of claim 8, wherein said means for selecting further comprises:

means for equating failure to select a contiguous block of data within said electronic document wherein one or more of said stored previous edits are to be undone with selecting the entire said electronic document.

10. The apparatus of claim 9, wherein said means for undoing further comprises:

means for determining if said user input is a either a selective undo operation or a selective undo all operation;

means, responsive to a determination that said user input is a selective undo operation, for undoing the most recent said stored previous edits performed within said selected contiguous block of data; and means, responsive to a determination that said user input is a selective undo all operation, for undoing all said stored previous edits performed within said selected contiguous block of data.

11. The apparatus of claim 9, wherein said means for selecting further comprises means for creating a select region record comprised of a select startpoint field and a select endpoint field.

12. The apparatus of claim 8, wherein said means for storing all previous edits further comprises means for creating a change record, for each previous edit, comprised of a change startpoint field, a change endpoint field, and a change data field.

13. The apparatus of claim 12, wherein said means for undoing further comprises:

means, responsive to a determination that a not yet examined change record nearest the top of said created undo chain is not an end-of-chain record, for retrieving said not yet examined change record;

means for examining said retrieved change record for the purpose of determining whether said retrieved change record contains changes performed within said selected contiguous block of data;

means for determining whether said user input is either a selective undo operation or a selective undo all operation;

means, responsive to a determination that said user input is a selective undo operation and said examining step yielding a determination that said retrieved record contains changes that were performed within said selected contiguous block of data, for substantially simultaneously undoing the changes indicated by said retrieved created change record's change data field and for removing said retrieved created change record from said created undo chain;

means, responsive to a determination that said user input is a selective undo all operation and said examining step yielding a determination that said retrieved change record contains changes that were performed within said selected contiguous block of data, for undoing the changes indicated by said retrieved created change record's change data field and for returning to said means for retrieving said not yet examined change record; and means, responsive to said examining step yielding a determination that said retrieved change record does not contain changes that were performed within said selected contiguous block of data, for returning to said means for retrieving said not yet examined change record.

14. The apparatus of claim 13, wherein said means for examining further comprises:

means for determining whether a first region delimited by said retrieved change record's change startpoint and change endpoint fields is encompassed by a second region delimited by said select region record's select startpoint field and select endpoint field; and means, responsive to a determination that said first region is encompassed within said second region, for determining that said retrieved change record contains changes that were performed within said selected contiguous block of data, but otherwise determining that said retrieved change record does not contain changes that were performed within said selected contiguous block of data.

15. A program product to be utilized with an editing system having electronic document editing capabilities, said program product providing an ability to selectively undo previous edits performed within a selected particular portion of an electronic document, and said program product comprising:

means for storing all previous edits performed within an electronic document comprising means for creating an undo chain comprised of a sequentially ordered list of said created change records said list ending with an end-of-chain record;

means for selecting a contiguous block of data within said electronic document wherein one or more of said stored previous edits are to be undone;

means, responsive to user input, for undoing a selected portion of said one or more said stored previous edits that have been done only within said selected contiguous block such that the ability to selectively undo said stored previous edits performed within a selected particular portion of an electronic document is achieved; and signal bearing media bearing said means for storing, means for selecting, and means for undoing.

16. The program product of claim 15 wherein said signal bearing media comprises recordable media.

17. The program product of claim 15 wherein said signal bearing media comprises transmission media.

18. The program product of claim 15, wherein said means for selecting further comprises:

means for equating failure to select a contiguous block of data within said electronic document wherein one or more of said stored previous edits are to be undone with selecting the entire said electronic document.

19. The program product of claim 18, wherein said means for undoing further comprises:

means for determining if said user input is a either a selective undo operation or a selective undo all operation;

means, responsive to a determination that said user input is a selective undo operation, for undoing the most recent said stored previous edits performed within said selected contiguous block of data; and means, responsive to a determination that said user input is a selective undo all operation, for undoing all said stored previous edits performed within said selected contiguous block of data.

20. The program product of claim 18, wherein said means for selecting further comprises means for creating a select region record comprised of a select startpoint field and a select endpoint field.

21. The program product of claim 15, wherein said means for storing all previous edits further comprises means for creating a change record, for each previous edit, comprised of a change startpoint field, a change endpoint field, and a change data field.

22. The program product of claim 21, wherein said means for undoing further comprises:

means, responsive to a determination that a not yet examined change record nearest the top of said created undo chain is not an end-of-chain record, for retrieving said not yet examined change record;

means for examining said retrieved change record for the purpose of determining whether said retrieved change record contains changes performed within said selected contiguous block of data;

means for determining whether said user input is either a selective undo operation or a selective undo all operation;

means, responsive to a determination that said user input is a selective undo operation and said examining step yielding a determination that said retrieved record contains changes that were performed within said selected contiguous block of data, for substantially simultaneously undoing the changes indicated by said retrieved created change record's change data field and for removing said retrieved created change record from said created undo chain;

means, responsive to a determination that said user input is a selective undo all operation and said examining step yielding a determination that said retrieved change record contains changes that were performed within said selected contiguous block of data, for undoing the changes indicated by said retrieved created change record's change data field and for returning to said means for retrieving said not yet examined change record; and means, responsive to said examining step yielding a determination that said retrieved change record does not contain changes that were performed within said selected contiguous block of data, for returning to said retrieving said not yet examined change record.

23. The program product of claim 22, wherein said means for examining further comprises:

means for determining whether a first region delimited by said retrieved change record's change startpoint and change endpoint fields is encompassed by a second region delimited by said select region record's select startpoint field and select endpoint field; and means, responsive to a determination that said first region is encompassed within said second region, for determining that said retrieved change record contains changes that were performed within said selected contiguous block of data, but otherwise determining that said retrieved change record does not contain changes that were performed within said selected contiguous block of data.

* * * * *